US012662866B2

(12) United States Patent
Braggion et al.

(10) Patent No.: US 12,662,866 B2
(45) Date of Patent: Jun. 23, 2026

(54) INTERCHANGEABLE RAIL TO JACKSHAFT CONVERSION

(71) Applicant: ASSA ABLOY Entrance Systems AB, Landskrona (SE)

(72) Inventors: Davide Braggion, Cassano d'Adda (IT); Edoardo Umberto Penato, Cislago (IT); Vickie Lents, Winston-Salem, NC (US); David P. Bresson, Pfafftown, NC (US)

(73) Assignee: ASSA ABLOY Entrance Systems AB, Landskrona (SE)

(*) Notice: Subject to any disclaimer, the term of this patent is extended or adjusted under 35 U.S.C. 154(b) by 0 days.

(21) Appl. No.: 18/794,302

(22) Filed: Aug. 5, 2024

(65) Prior Publication Data

US 2026/0035982 A1 Feb. 5, 2026

(51) Int. Cl.
*E05F 15/681* (2015.01)

(52) U.S. Cl.
CPC ....... *E05F 15/681* (2015.01); *E05Y 2201/684* (2013.01); *E05Y 2201/716* (2013.01); *E05Y 2600/452* (2013.01); *E05Y 2900/106* (2013.01)

(58) Field of Classification Search
CPC ..... E05F 15/668; E05F 15/681; E05F 15/684; E05F 15/686
See application file for complete search history.

(56) References Cited

U.S. PATENT DOCUMENTS 6,789,591 B2 * 9/2004 Ikeda .................... B60C 13/02 249/141
12,359,491 B2 * 7/2025 Penato ................ E05F 15/668
(Continued)

FOREIGN PATENT DOCUMENTS

WO 2008071401 A1 6/2008
WO 2016180524 A1 11/2016
WO 2024132846 A1 6/2024

OTHER PUBLICATIONS

Search Report and Written Opinion from corresponding International Application No. PCT/EP2025/070504, mailed Oct. 28, 2025, all pages cited in its entirety.

*Primary Examiner* — Marcus Menezes
(74) *Attorney, Agent, or Firm* — Burr & Forman

(57) ABSTRACT

A GDO conversion assembly for transitioning between a ceiling mounted and a jackshaft configuration includes a motorhead having a motor output shaft extending from a motorhead casing that includes a mounting interface disposed proximate to the motor output shaft, a track assembly including an input interface shaped to mate with the mounting interface to operably couple the motorhead to a sectional garage door, and a transmission assembly including an input coupler shaped to mate with the mounting interface to operably couple the motorhead to the sectional garage door. The transmission assembly includes an output coupler to operably couple the transmission assembly to a drive tube rotatable to alternately open and close the sectional door. The output coupler includes an output pinion. The input coupler includes an input pinion operably coupled to the output pinion via a flexible coupling member. The transmission assembly includes a transmission housing and a coupling bracket.

18 Claims, 16 Drawing Sheets

(56) References Cited

U.S. PATENT DOCUMENTS

| | | | | |
|---|---|---|---|---|
| 2004/0144201 | A1* | 7/2004 | Gunton | E05F 15/603<br>74/840 |
| 2005/0175401 | A1* | 8/2005 | Hoermann | E05F 15/668<br>403/326 |
| 2013/0038183 | A1* | 2/2013 | Chen | E05F 15/668<br>310/75 R |
| 2013/0314019 | A1* | 11/2013 | Wilmes | E05D 13/1261<br>318/470 |

* cited by examiner

INTERCHANGEABLE RAIL TO JACKSHAFT CONVERSION

TECHNICAL FIELD

Example embodiments generally relate to garage door operators (GDOs) and, in particular, relate to a conversion assembly for a GDO that is convertible between a jackshaft configuration and a ceiling mounted or trolley configuration.

BACKGROUND

There have long been multiple solutions for providing residential GDOs. One such solution is for ceiling mounted, trolley GDOs that have a ceiling mounted linear force operator that drags one of the connected sections of the sectional door through the guides the door rides in between open and closed positions. Another solution, referred to as a jackshaft GDO, is a rotary torque operator mounted on the drive tube or shaft that rotates drums at opposing ends thereof. The drums coil and uncoil cables connected to the sectional door to pass the door through the guides between open and closed positions. Until recently, these two solutions have been provided in two relatively distinct garage door opener solutions with customers choosing products in one category for jackshaft GDOs and products from another category for ceiling mounted GDOs.

More recently, thought has been given to providing a single product that can be installed in either configuration (e.g., ceiling mounted or jackshaft). Thus, for example, the product may be installed as a ceiling mounted GDO (in what is sometimes called a trolley configuration), and then converted to be reinstalled in the jackshaft configuration, if desired.

BRIEF SUMMARY OF SOME EXAMPLES

In an example embodiment, a garage door operator (GDO) conversion assembly for transitioning a GDO between a ceiling mounted configuration and a jackshaft configuration may be provided. The GDO conversion assembly may include a motorhead having a motor output shaft extending from a motorhead casing that includes a mounting interface disposed proximate to the motor output shaft, a track assembly including an input interface shaped to mate with the mounting interface to operably couple the motorhead to a sectional garage door in the ceiling mounted configuration, and a transmission assembly including an input coupler shaped to mate with the mounting interface to operably couple the motorhead to the sectional garage door in the jackshaft configuration. The transmission assembly may be interchangeable with the track assembly and further includes an output coupler to operably couple the transmission assembly to a drive tube rotatable to alternately open and close the sectional door in the jackshaft configuration. The output coupler may include an output pinion. The input coupler may include an input pinion operably coupled to the output pinion via a flexible coupling member. The transmission assembly may include a transmission housing configured to extend around at least a portion of each of the input pinion, the output pinion and the flexible coupling member, and a coupling bracket to operably couple the motorhead to either a wall or the ceiling.

In another example embodiment, garage door operator (GDO) system may be provided. The system may include a sectional door movable on rails between an open position and a closed position, a motorhead operable to provide power for movement of the sectional door between the open and closed positions via turning of a drive tube in a jackshaft configuration or via movement of a trolley in a ceiling mounted configuration, and a GDO conversion kit. The motorhead may include a motor output shaft extending from a motorhead casing. The motorhead casing may include a mounting interface disposed proximate to the motor output shaft. The GDO conversion kit may facilitate transitioning a GDO between the ceiling mounted configuration and the jackshaft configuration. The GDO conversion kit may include a track assembly including an input interface shaped to mate with the mounting interface to operably couple the motorhead to a sectional garage door in the ceiling mounted configuration, and a transmission assembly including an input coupler shaped to mate with the mounting interface to operably couple the motorhead to the sectional garage door in the jackshaft configuration. The transmission assembly may be interchangeable with the track assembly and further include an output coupler to operably couple the transmission assembly to a drive tube rotatable to alternately open and close the sectional door, the output coupler comprising an output pinion. The input coupler may include an input pinion operably coupled to the output pinion via a flexible coupling member. The transmission assembly may further include a transmission housing configured to extend around at least a portion of each of the input pinion, the output pinion and the flexible coupling member, and a coupling bracket to operably couple the motorhead to either a wall or the ceiling.

BRIEF DESCRIPTION OF THE SEVERAL VIEWS OF THE DRAWING(S)

Having thus described some example embodiments in general terms, reference will now be made to the accompanying drawings, which are not necessarily drawn to scale, and wherein:

Figure 13:
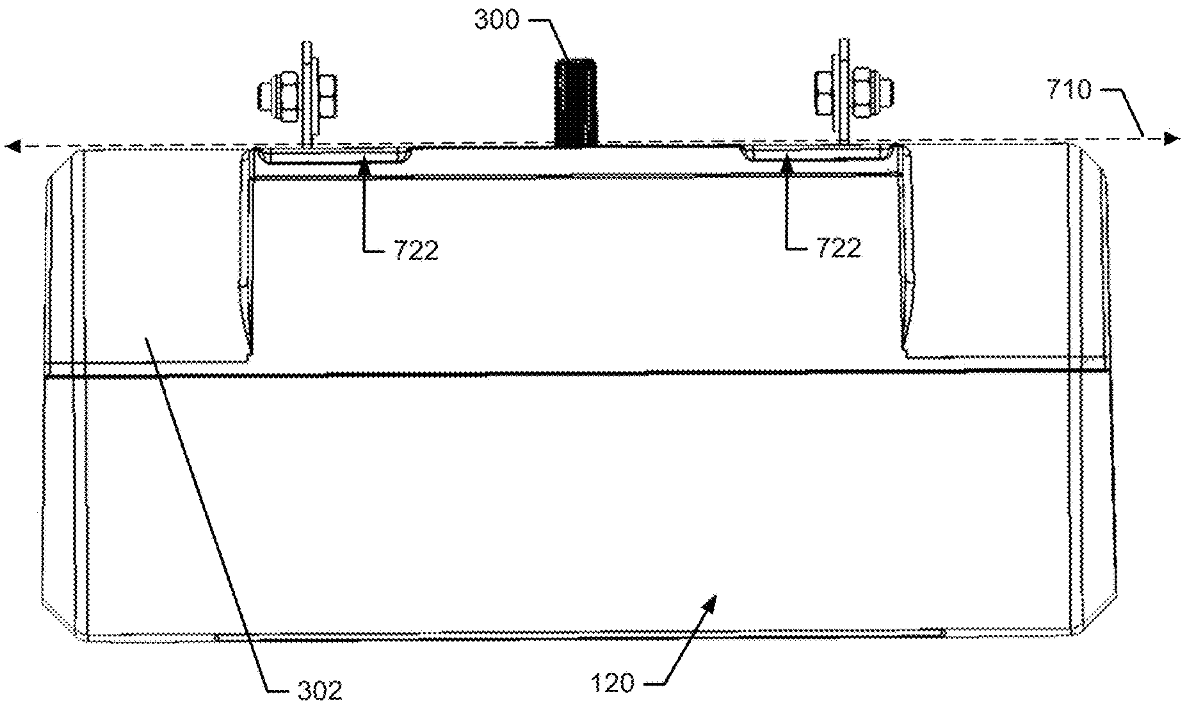
Figure 14:
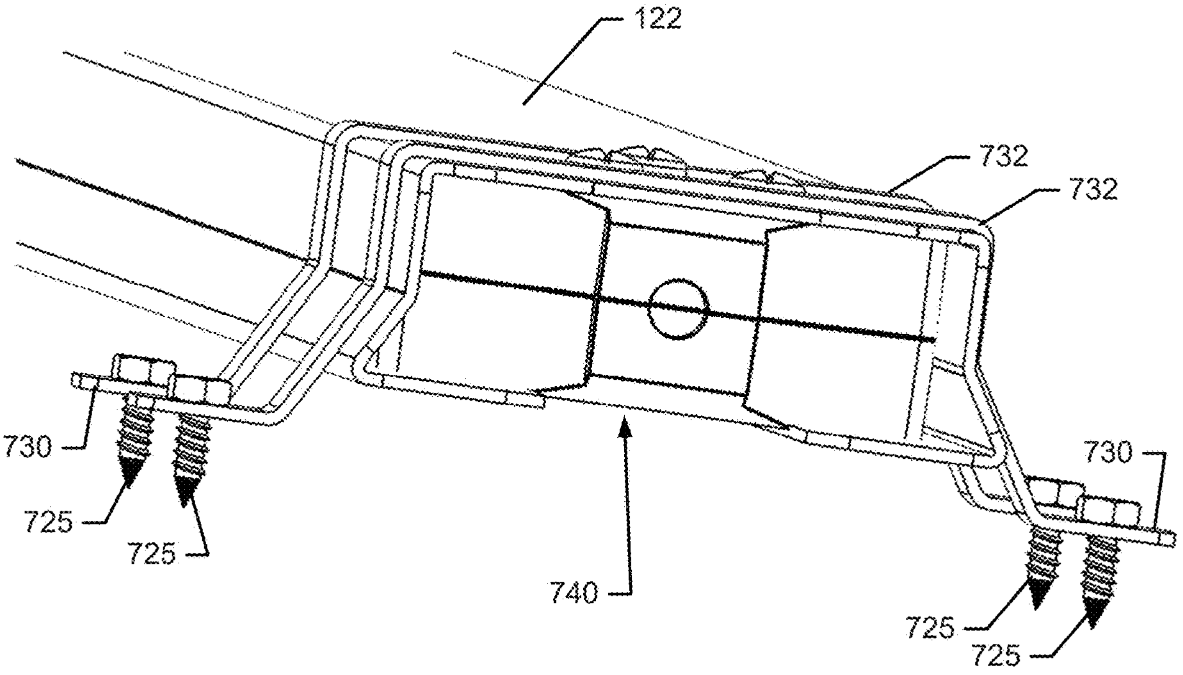
Figure 15:
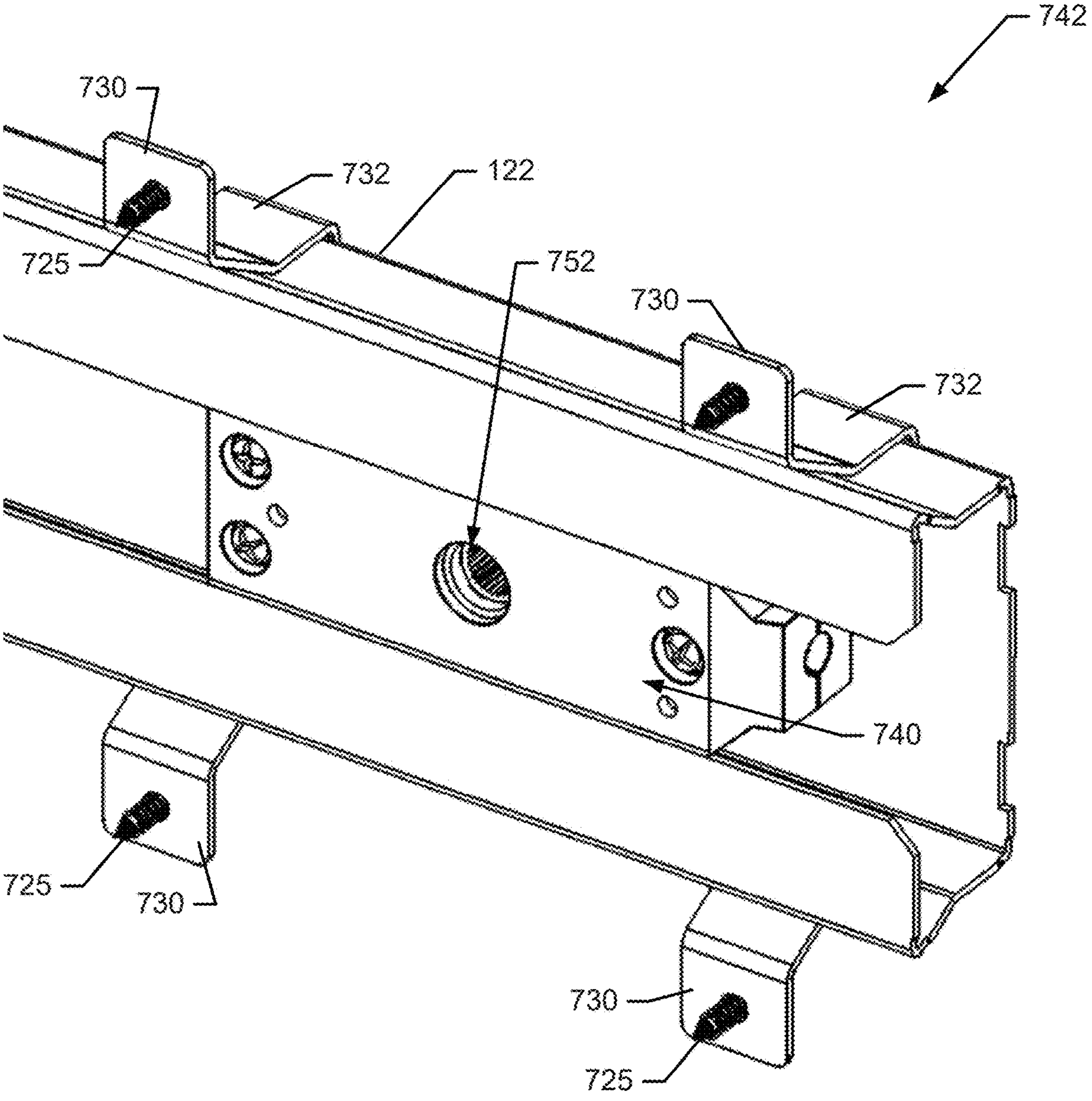
Figure 16:
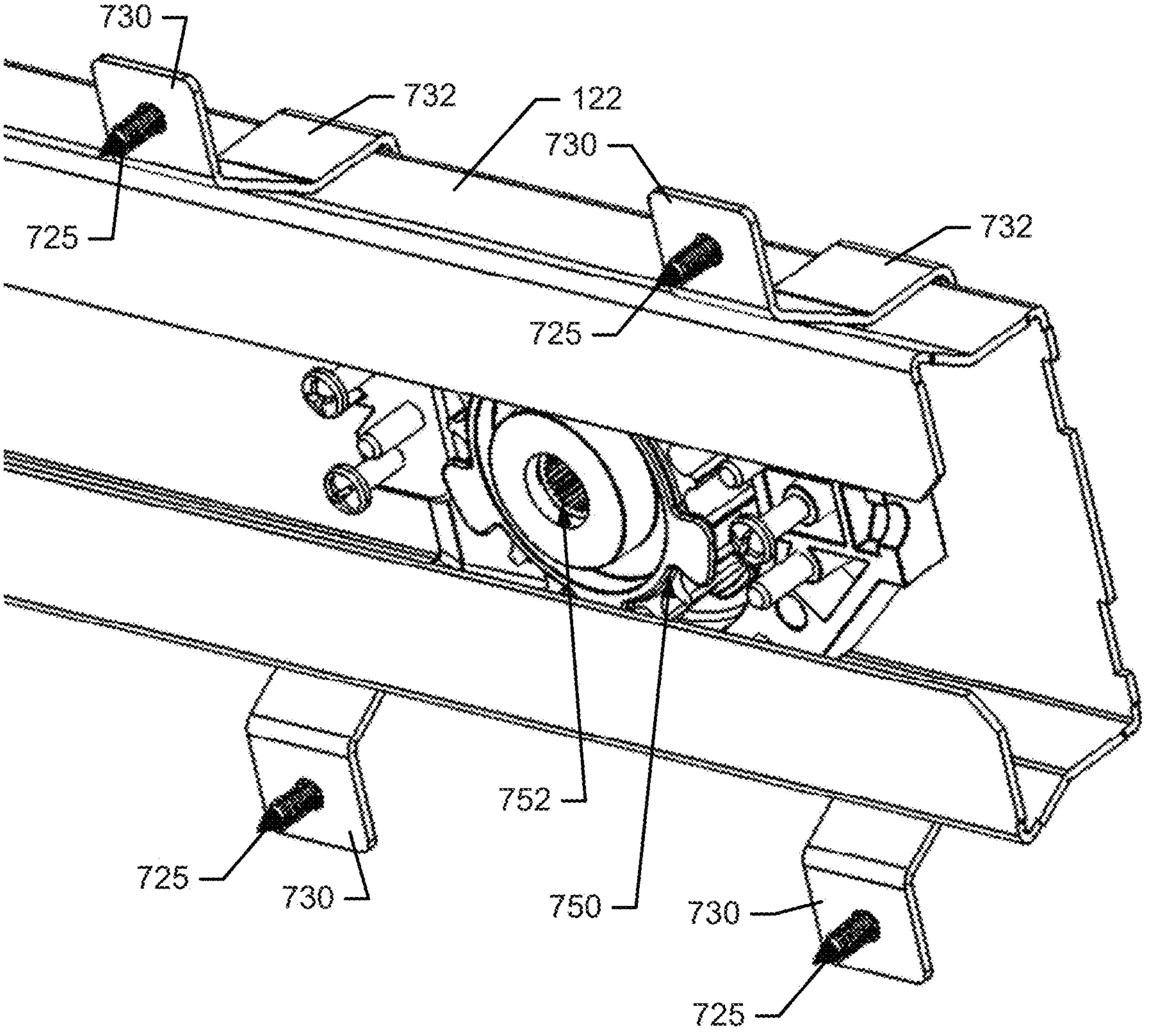

FIG. 13 provides a top view of the motorhead in accordance with an example embodiment;

FIG. 14 shows a perspective view of a track assembly in accordance with an example embodiment;

FIG. 15 shows an input interface of the track assembly in accordance with an example embodiment; and FIG. 16 shows some internal components of the internal interface in accordance with an example embodiment.

DETAILED DESCRIPTION

Some example embodiments now will be described more fully hereinafter with reference to the accompanying drawings, in which some, but not all example embodiments are shown. Indeed, the examples described and pictured herein should not be construed as being limiting as to the scope, applicability or configuration of the present disclosure. Rather, these example embodiments are provided so that this disclosure will satisfy applicable legal requirements. Like reference numerals refer to like elements throughout. Furthermore, as used herein, the term "or" is to be interpreted as a logical operator that results in true whenever one or more of its operands are true. As used herein, operable coupling should be understood to relate to direct or indirect connection that, in either case, enables functional interconnection of components that are operably coupled to each other.

As indicated above, it may be desirable to provide a conversion kit from trolley configuration to jackshaft configuration. Example embodiments may provide such a conversion kit in a complete and multifunctional system that can be installed on either side of the sectional door in a jackshaft configuration or with a rail in a ceiling mounted or trolley configuration by use of a rail that is interchangeable with a jackshaft transmission in terms of connectivity to door hardware and the GDO opener or motorhead. Moreover, in some cases, the solution of example embodiments may be housed within a transmission component housing or interchangeable rail housing so that there is no opportunity for pinching or other interaction with fingers or body parts of operators, installers, or anyone else.

Figure 1:
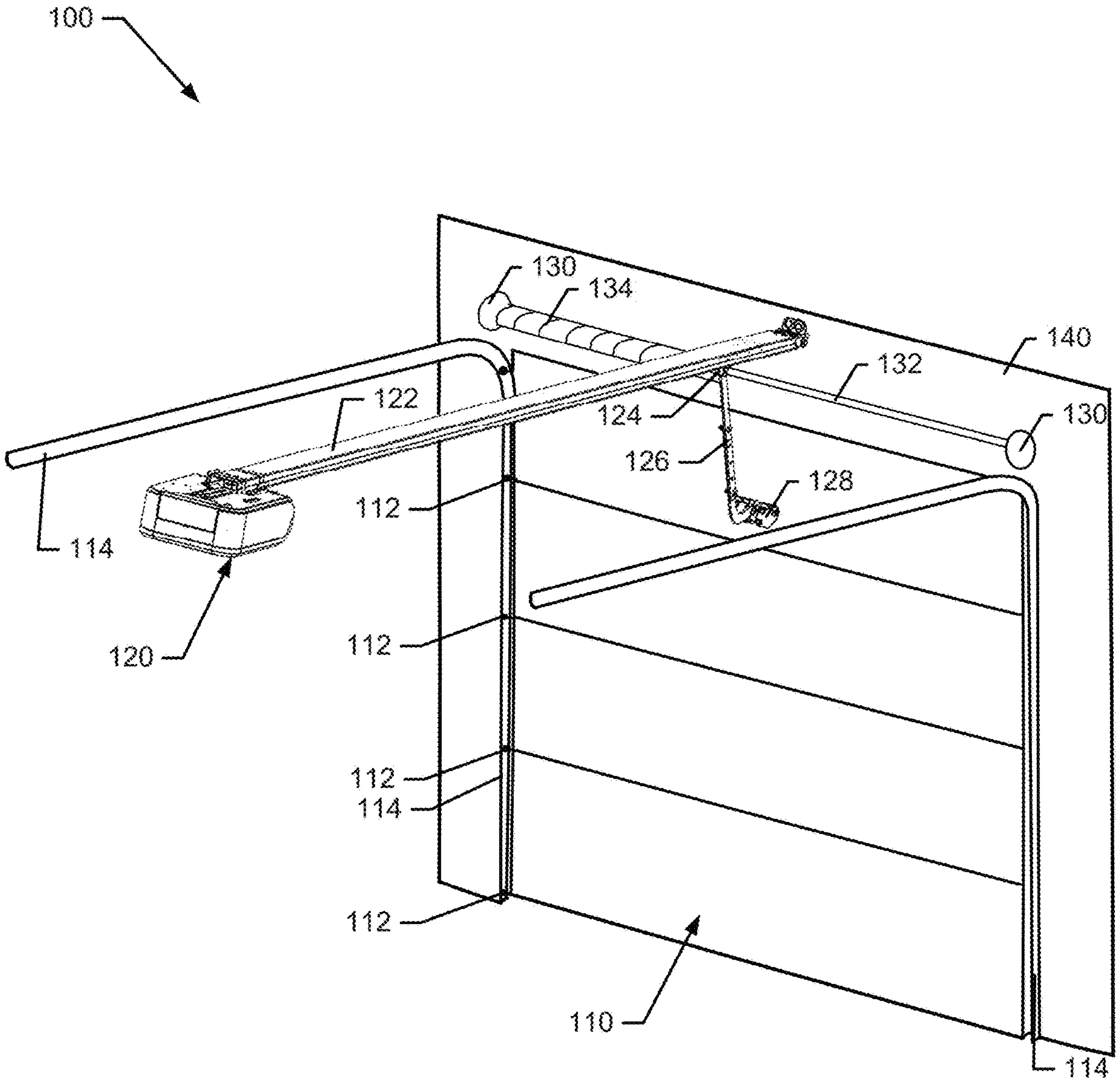
FIG. 1 illustrates a perspective view of a GDO system in a ceiling mounted or trolley in accordance with an example embodiment.
Figure 2:
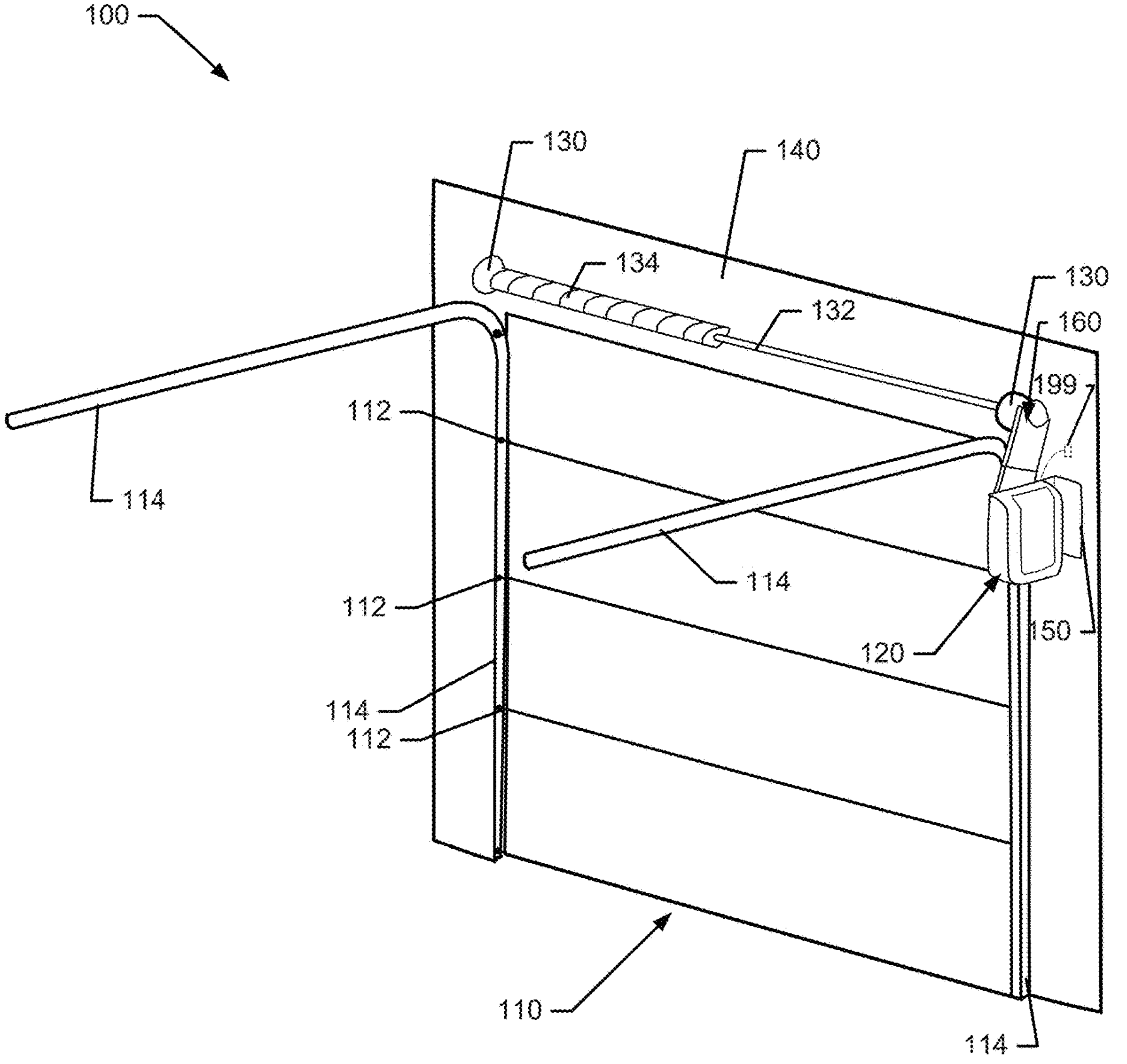
FIG. 2 illustrates a perspective view of the GDO system in a jackshaft configuration in accordance with an example embodiment.

FIGS. 1 and 2 illustrate a GDO system 100 of an example embodiment. In this regard, FIG. 1 shows the GDO system 100 in a trolley configuration, and FIG. 2 shows the GDO system 100 in a jackshaft configuration. In both cases, the GDO system 100 includes a sectional door 110, in which each section of the door has wheels 112 operably coupled to opposing lateral sides of the sections. The wheels 112 ride in rails 114 disposed on opposing sides of the sectional door 110 as the sectional door 110 transitions between open and closed positions. The sectional door 110 of FIGS. 1 and 2 is shown in the closed position, where the wheels 112 are in a vertical section of the rails 114. Thus, it can be appreciated that in the open position the wheels 112 are located in a horizontally extending portion of the rails 114.

FIGS. 1 and 2 also illustrate a GDO unit referred to as opener 120 or motorhead. The opener 120 of this example may be converted from trolley configuration (shown in FIG. 1) to a jackshaft configuration (shown in FIG. 2). In the trolley configuration, a guide rail 122 may extend parallel to and approximately midway between the horizontally extending portion of the rails 114 on opposing lateral sides of the sectional door 110. The opener 120 may be mounted (e.g., from the ceiling) proximate to an end of the guide rail 122 to drive a trolley 124 along the guide rail 122 via a flexible member such as a belt, cable or chain. The belt, cable or chain may also be operably coupled (e.g., via the trolley 124) to a top portion of the sectional door 110 by an engaging arm 126 and engaging bracket 128 that is attached to the sectional door 110. As noted above, the trolley 124 may be manually released from the sectional door 110 to allow for manual repositioning of the sectional door 110.

In some cases, the sectional door 110 may also be supported by one or more instances of cables that are alternately wound onto and off of one or more cable drums 130 disposed at or near opposing ends of a tube 132 (sometimes called a drive tube). The tube 132 may further support a spring assembly 134 that facilitates, along with the cables, supporting the weight of the sectional door 110 during opening and closing operations of the sectional door 110 using the opener 120. The sectional door 110, when closed, may block an opening provided in a front wall 140 of the garage in which the GDO system 100 is installed. The opening may be left open when the sectional door 110 is raised onto the horizontally extending portions of the rails 114. As can be seen in FIG. 1, the guide rail 122 may be secured to the front wall 140 at a proximal end of the guide rail 122, and the opener 120 may be suspended from the ceiling of the garage at a distal end of the guide rail 122.

The opener 120 of FIG. 1 (i.e., the exact same unit shown in FIG. 1) may be converted to a jackshaft configuration shown in FIG. 2 by mounting the opener 120 to the front wall 140. The opener 120 may also be mounted proximate to one of the rails 114 (or proximate to one of the drums 130) via a mounting bracket 150, on either side of the sectional door 110. In FIG. 2, the opener 120 is mounted on the right side (from the perspective of a viewer in the garage looking toward the sectional door 110) of the sectional door 110. However, the opener 120 could alternatively be installed on the left side of the sectional door 110. In either case, the opener 120 may be operably coupled to the tube 132 (now acting as a drive tube) via a transmission assembly 160. The opener 120 may then turn the tube 132 and thereby also turn the drum 130 disposed at an end of the tube 132 closest to the opener 120. The drum 130 may coil and uncoil cable for operation to close and open the sectional door 110 responsive to turning initiated by the opener 120.

The opener 120 may be configurable to interface with both the guide rail 122 and the transmission assembly 160. Thus, for example, the opener 120, the guide rail 122 and the transmission assembly 160 may be sold as a kit of parts (along with other hardware and software in some cases) to provide one complete assembly capable of being mounted in either the ceiling mounted (trolley) configuration or the jackshaft configuration. Thus, the guide rail 122 and the transmission assembly 160 are effectively interchangeable in terms of their ability to connect directly to the opener 120.

The transmission assembly 160 may include componentry for adapting drive speeds and torque from those applicable to the trolley configuration to those applicable to the jackshaft configuration. As an example, the transmission assembly 160 may include gearing and a flexible coupler (e.g., a belt, cable or chain) that extends between gears of such gearing with input coupling provided to an output of the opener 120, and output coupling provided to the tube 132. The transmission assembly 160, via gears and/or other structures provided therein, may prevent back driving of the opener 120 when in the jackshaft configuration. This may allow the elimination, in some cases, of extra locking mechanisms that are otherwise required to prevent back driving of jackshaft configured GDOs.

As noted above, the opener 120 is disposed on the right side of the sectional door 110 (from the interior perspective) in FIG. 2. However, some embodiments may allow the mounting bracket 150 to be repositioned relative to the opener 120 so that the opener 120 may alternatively be mounted on the left side of the sectional door 110. Accordingly, the transmission assembly 160 (of which the mounting bracket 150 may be considered to be a portion) could be reversed in direction to accommodate mounting on either side of the sectional door 110. Furthermore, as will be explained in greater detail below, the mounting bracket 150, the transmission assembly 160 and the opener 120 may have features for coupling each other together that permit not only the mirrored opposite mounting option to that shown in FIG. 2 mentioned above, but still other mounting options including mounting of the opener 120 to the front wall 140 above the tube 132 (instead of below the tube 132 as shown in FIG. 2), and mounting the opener 120 from the ceiling (again on either side of the sectional door 110). A power cord 199 may extend from the opener 120 to a power receptacle at the front wall 140 (or the ceiling in ceiling mounted options) to receive power. Thus, the GDO system 100 of example embodiments not only allows alternating between the jackshaft configuration and the trolley configuration, but further allows tremendous flexibility for mounting the opener 120 in the jackshaft configuration in many different ways to suit not only the desires of the owner of the garage, but also to suit many unique garage structures where different power and structural limitations may exist.

As can be appreciated from the description above, in order to provide the flexibility intended with respect to supporting many different configurations, an equally flexible or configurable set of structures must be provided for installation. In an example embodiment, the mounting bracket 150 mentioned briefly above may be structured, along with either or both of the opener 120 and the transmission assembly 160, to provide such flexibility. In particular, the mounting bracket 150 may be structured as a multi-position coupling bracket as described in greater detail below.

Figure 3:
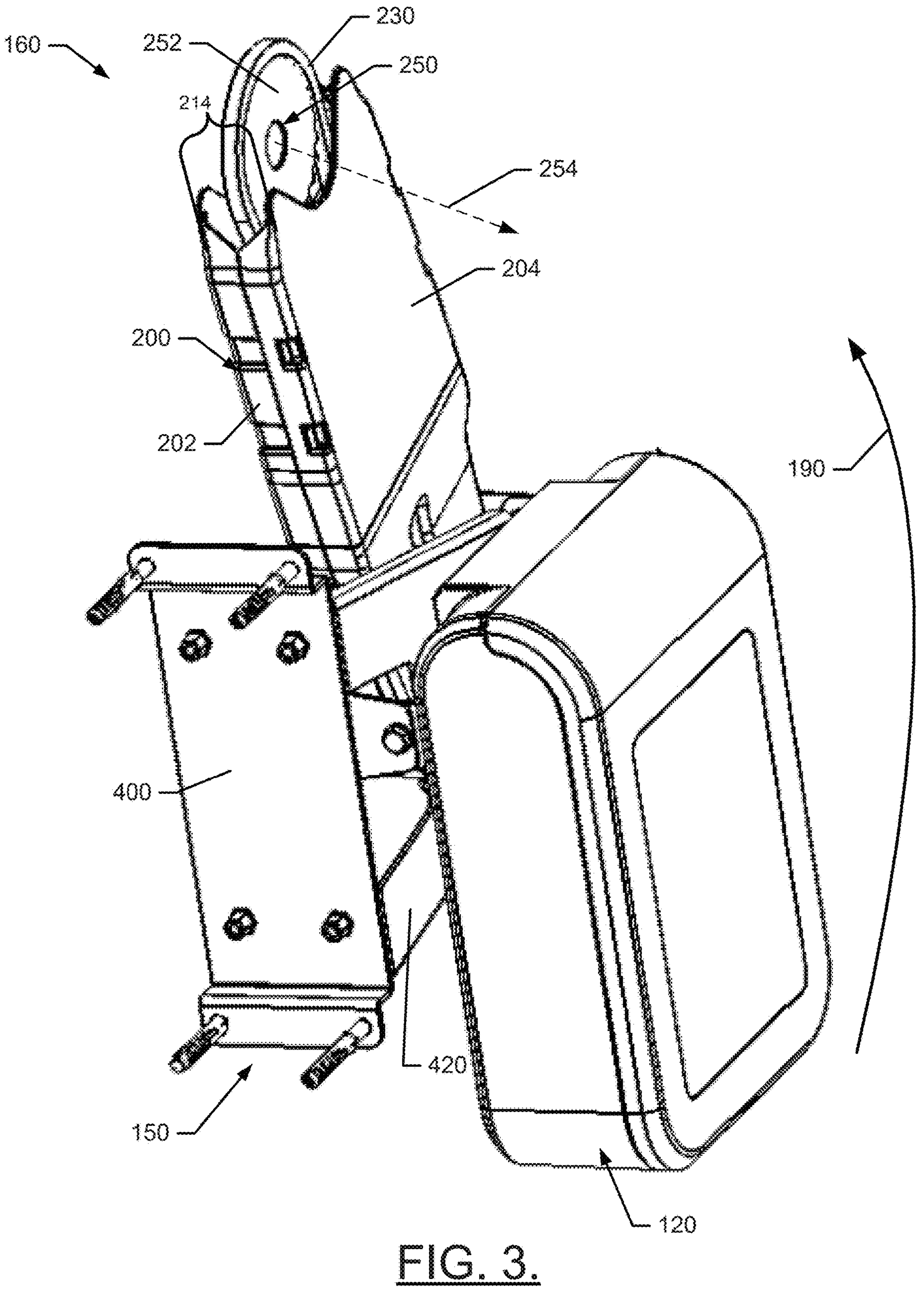
FIG. 3 illustrates a perspective view of an opener in the jackshaft configuration attached to a transmission assembly for provision on an opposite side of the door from that shown in FIG. 2 in accordance with an example embodiment.

The jackshaft configuration shown in FIG. 2 provides the mounting bracket 150 to be attached to the front wall 140 on the right side of the sectional door 110. However, since the mounting bracket 150 is a multi-position coupling bracket, the relationship or orientation between the mounting bracket 150 and the opener 120 can be flipped (e.g., 180 degrees) so that, as shown in FIG. 3, the mounting bracket 150 can be mounted to the left side of the sectional door 110. Moreover, in each of these configurations, the entire transmission assembly 160 (including the mounting bracket 150 in whichever orientation it is provided) and the opener 120 can also be flipped upside down so that rather than the transmission assembly 160 extending above the opener 120 (as shown in FIGS. 2 and 3), the opener 120 could be above the transmission assembly 160. Providing yet further flexibility, other mounting configurations are also possible, such as the mounting of the mounting bracket 150 to the ceiling, and corresponding placement of the transmission assembly 160 to extend downward to interact with the tube 132. Given that his ceiling mounted configuration can also be duplicated on either side of the sectional door 110, at least six different configurations of the mounting bracket 150, transmission assembly 160 and opener 120 are possible via the structures described below. A first of these six configurations is shown, as noted above, in FIG. 2, and a second is shown in FIG. 3. By flipping the arrangement of FIG. 3 in the direction of arrow 190 to achieve a 180 degree reorientation of the opener 120 and the transmission assembly 160, the transmission assembly 160 may be extended downward from the opener 120 to engage the tube 132 instead of upward (as shown in FIGS. 2 and 3). Furthermore, additional coupling flexibility is provided to ensure easy installation with minor variations in wall position relative to the tube 132 or other variations as well.

Figure 4:
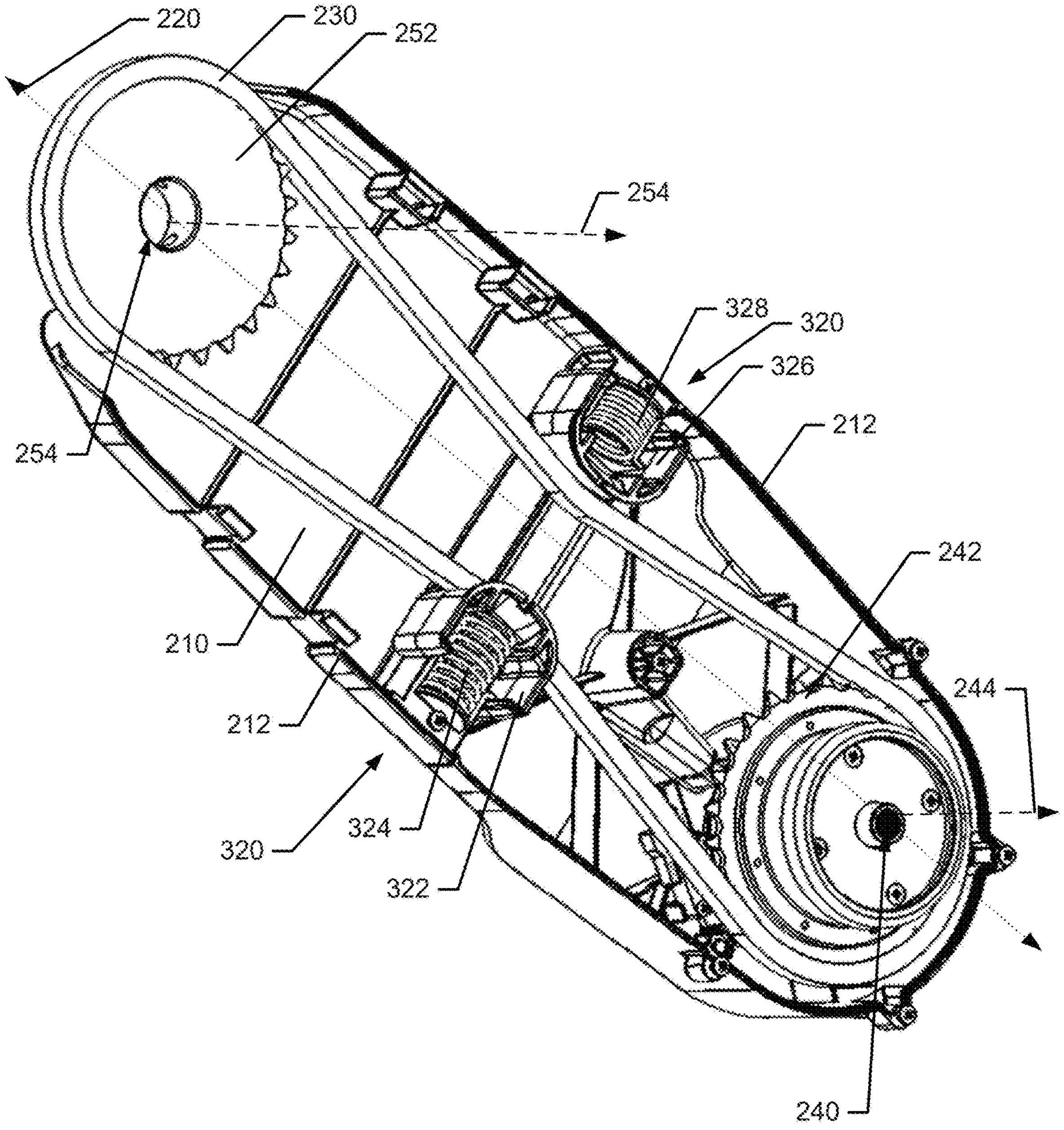
FIG. 4 shows a perspective view of the transmission assembly with one half shell removed according to an example embodiment.

The transmission assembly 160 may include the mounting bracket 150, and may further include a transmission housing 200 shown in more detail in FIG. 3. An inside view of the transmission housing 200 is shown in FIG. 4. Referring now primarily to FIGS. 3 and 4, the transmission housing 200 of the transmission assembly 160 may include a first half shell 202 and a second half shell 204 that may be molded or otherwise formed to include mating features that combine together to enclose a substantial portion of the components of the transmission assembly 160 and provide both rigidity to the structure and mounting features for interaction with other components. The first and second half shells 202 and 204 may each include a base portion 210 (shown in FIG. 4 for the first half shell 202) and sidewalls 212 that extend substantially perpendicularly away from the base portion 210. The sidewalls 212 may include the mating features, and may combine to form longitudinal sides 214 on opposing sides of a longitudinal centerline 220 of the transmission housing 200.

The transmission assembly 160 may include a flexible coupling member 230 that extends between an input coupler 240 having an input pinion 242 and an output coupler 250 having an output pinion 252. The flexible coupling member 230 may be a belt, chain, cable or other such structure that engages the input pinion 242 and the output pinion 252 and generally transfers any rotation caused at the input pinion 242 to the output pinion 252. In particular, when the opener 120 operates, the input pinion 242 is correspondingly turned (albeit perhaps at a different rate dependent upon gearing ratios employed between the input coupler 240 and the input pinion 242, if applicable).

The input coupler 240 may be a splined receiver or shaft that interfaces with a complementary structure of a motor output shaft 300 (see FIG. 5) along an input axis 244. In the examples shown, the input coupler 240 is a splined receiver that engages splines of the motor output shaft 300. The input coupler 240 may also include physical structures to prevent back driving of the opener 120 via the attachment of the tube 132 and/or drum 130 to the opener 120 through the transmission assembly 160 as noted above. The output coupler 250 may be a splined receiver or shaft that interfaces with a complementary structure of the tube 132 or drum 130 along an output axis 254. In the examples shown, the output coupler 250 is a splined receiver as well. The input coupler 240 may be formed proximate the input axis 244, which is aligned with the motor output shaft 300 (see FIG. 5) of the opener 120 when the input coupler 240 is operably coupled to the opener 120 via the motor output shaft 300. The output coupler 250 may be formed proximate the output axis 254 and may be aligned with an axis of the tube 132 when the output coupler 250 is operably coupled to the tube 132 and/or drum 130.

The opener 120 may include an electric motor and control circuitry, which may be disposed inside a casing 302 (or housing) of the opener 120. The motor, when operating, may turn the motor output shaft 300 in a direction that corresponds to either opening or closing of the sectional door 110. The rotation of the motor output shaft 300 may be transferred to the input coupler 240 and input pinion 242 to carry the flexible coupling member 230. The flexible coupling member 230 may in turn carry the output pinion 252, which may be operably coupled to the output coupler 250 that in turn moves the drum 130 and/or tube 132. However, the flexible coupling member 230 may only communicate movement between the input pinion 242 and the output pinion 252 when the flexible coupling member 230 is tensioned properly. To provide such tensioning, the transmission assembly 160 may further include a tensioning assembly 320. The tensioning assembly 320 may be disposed on opposing sidewalls 212 (and therefore longitudinal sides 214) of the transmission housing 200 to engage the flexible coupling member 230 and to tension the flexible coupling member 230. In this regard, for example, the tensioning assembly 320 may include a first tensioning member 322 and first biasing member 324 attached on of the sidewalls 212 of the transmission housing 200 to urge a first portion of the flexible coupling member 230 toward the opposite side of the transmission housing 200, and a second tensioning member 326 and second biasing member 328 attached the opposite one of the sidewalls 212 of the transmission housing 200 to urge a second portion of the flexible coupling member 230 in the opposite direction.

During installation, the mounting bracket 150 may be attached to the front wall 140 (or ceiling) and also be operably coupled to the transmission assembly 160 and the opener 120. However, as noted above, the mounting bracket 150 may be positioned relative to the opener 120 in various different ways to provide flexibility. After these connections are made, the transmission assembly 160 may then be operably coupled to the tube 132 or drum 130. To facilitate this final connection after other components are largely fixed in place, further flexibility is again provided by the design of the mounting bracket 150. However, the transmission housing 200 is also left open proximate to the output coupler 250 and output pinion 252 to provide more easy access to the output coupler 250 for mating with the tube 132 and/or drum 130.

In an example embodiment, the mounting bracket 150 may be structured as a multi-position coupling bracket by having distinct portions that provide for a series of discrete different mounting positions of the opener 120 on the mounting bracket 150, but a series of non-discrete mounting positions of the transmission assembly 160 relative to the mounting bracket 150. To facilitate these different dimensions of flexibility, the mounting bracket 150 may include a wall interface portion 400 for rigid connection to a wall (e.g., the front wall 140 or ceiling), a transmission interface portion 410 to hold the transmission housing 200 relative to the wall interface portion 400, and a motorhead interface portion 420 to operably couple the wall interface portion relative to the opener 120 (which may also be referred to as a motorhead). FIGS. 6-9 include various views of the mounting bracket 150 to demonstrate how the flexibility discussed above is provided.

Figure 6:
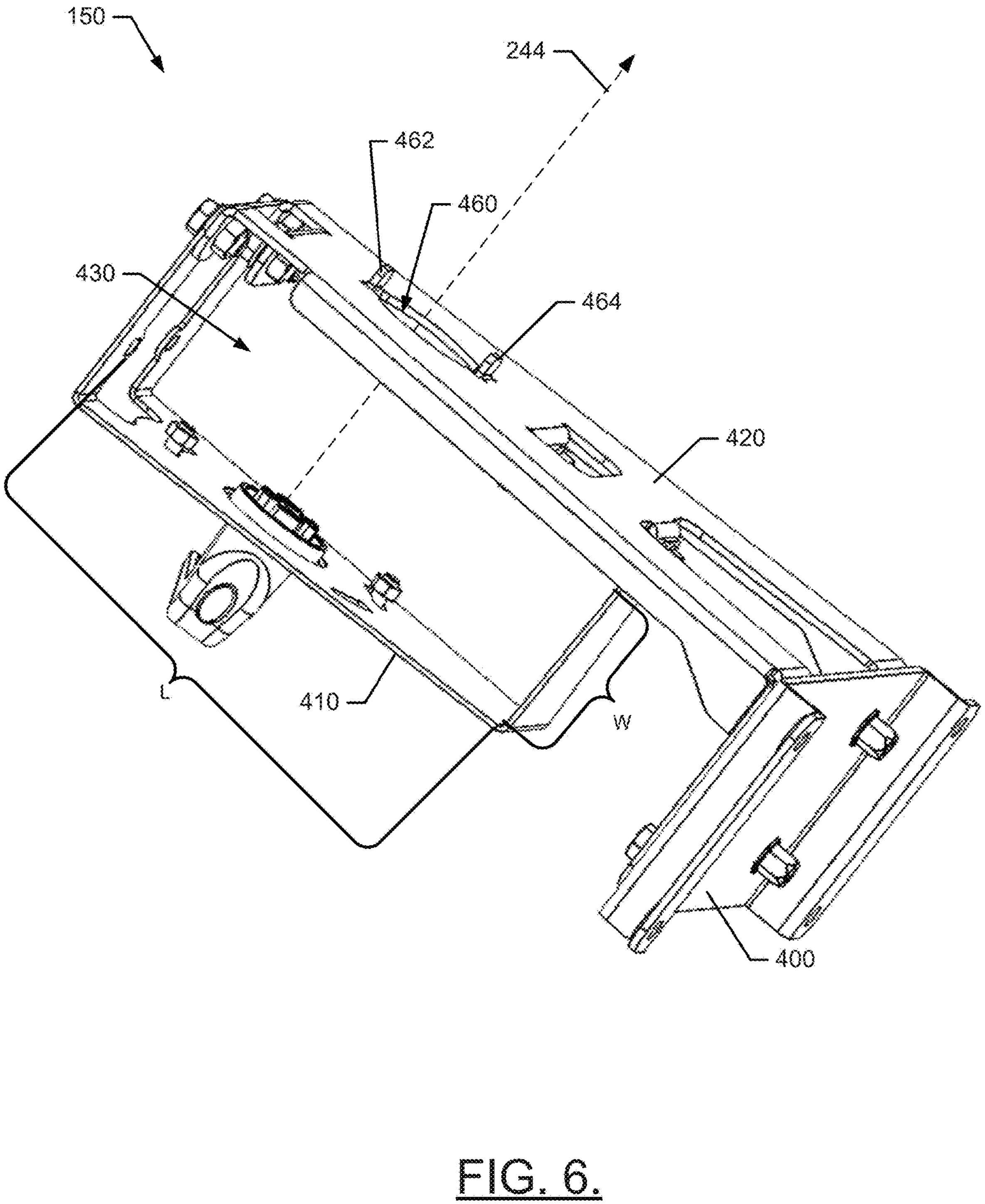
FIG. 6 illustrates a perspective view of a multi-position mounting bracket in accordance with an example embodiment.
Figure 7:
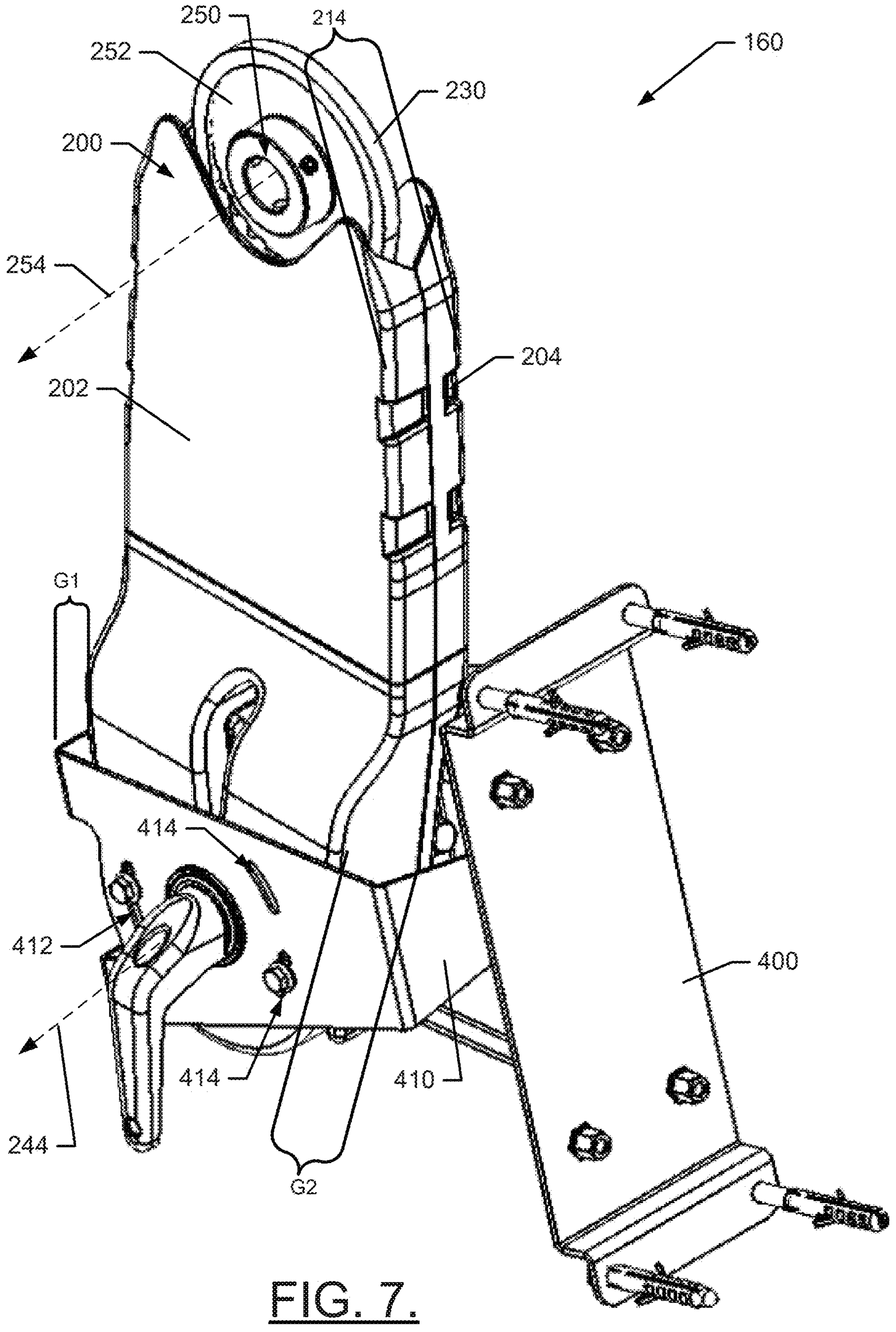
FIG. 7 illustrates the mounting bracket having the transmission assembly provided therein in accordance with an example embodiment.
Figure 8:
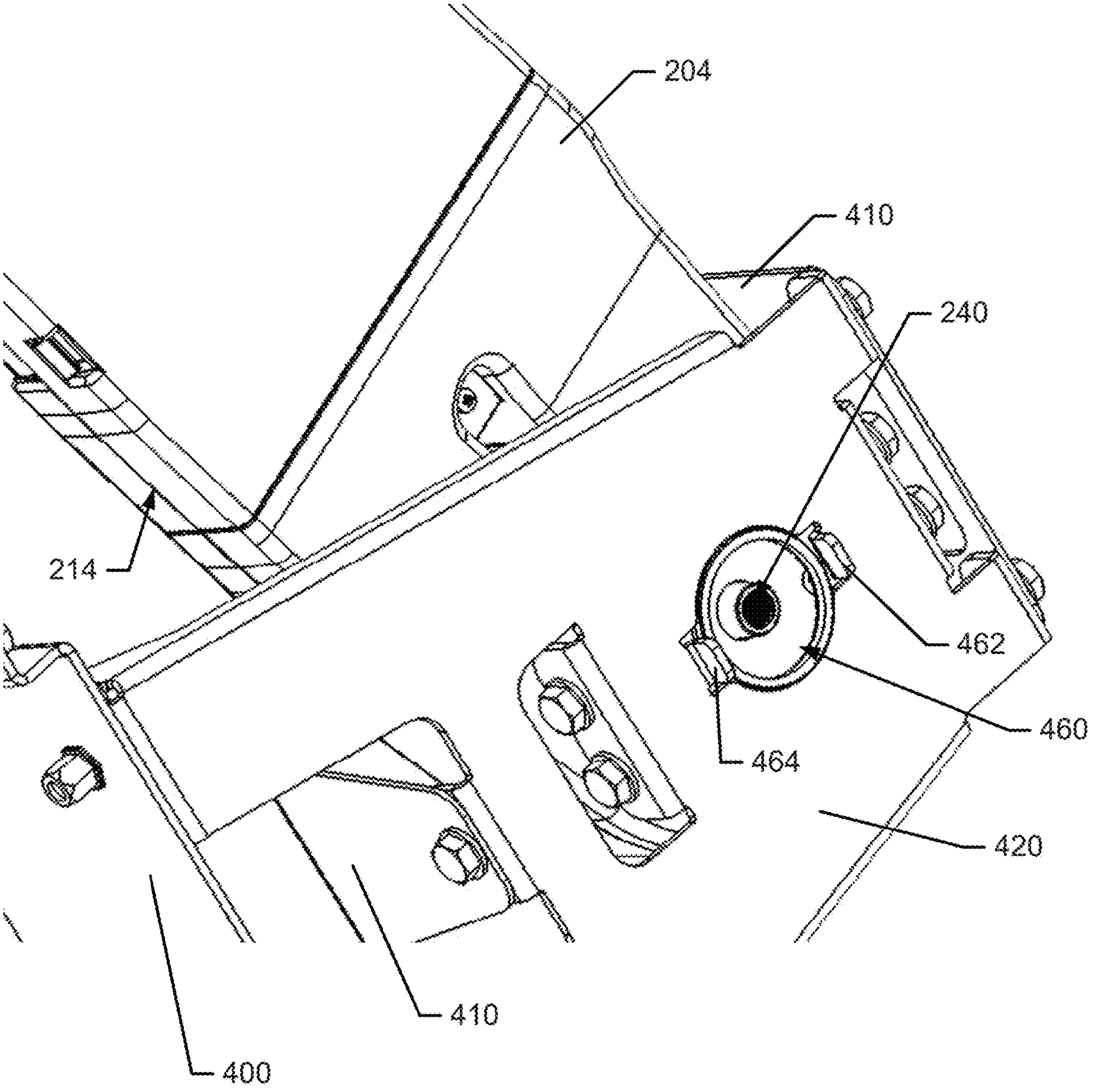
FIG. 8 illustrates a perspective view of the motorhead interface portion of the mounting bracket in accordance with an example embodiment.
Figure 9:
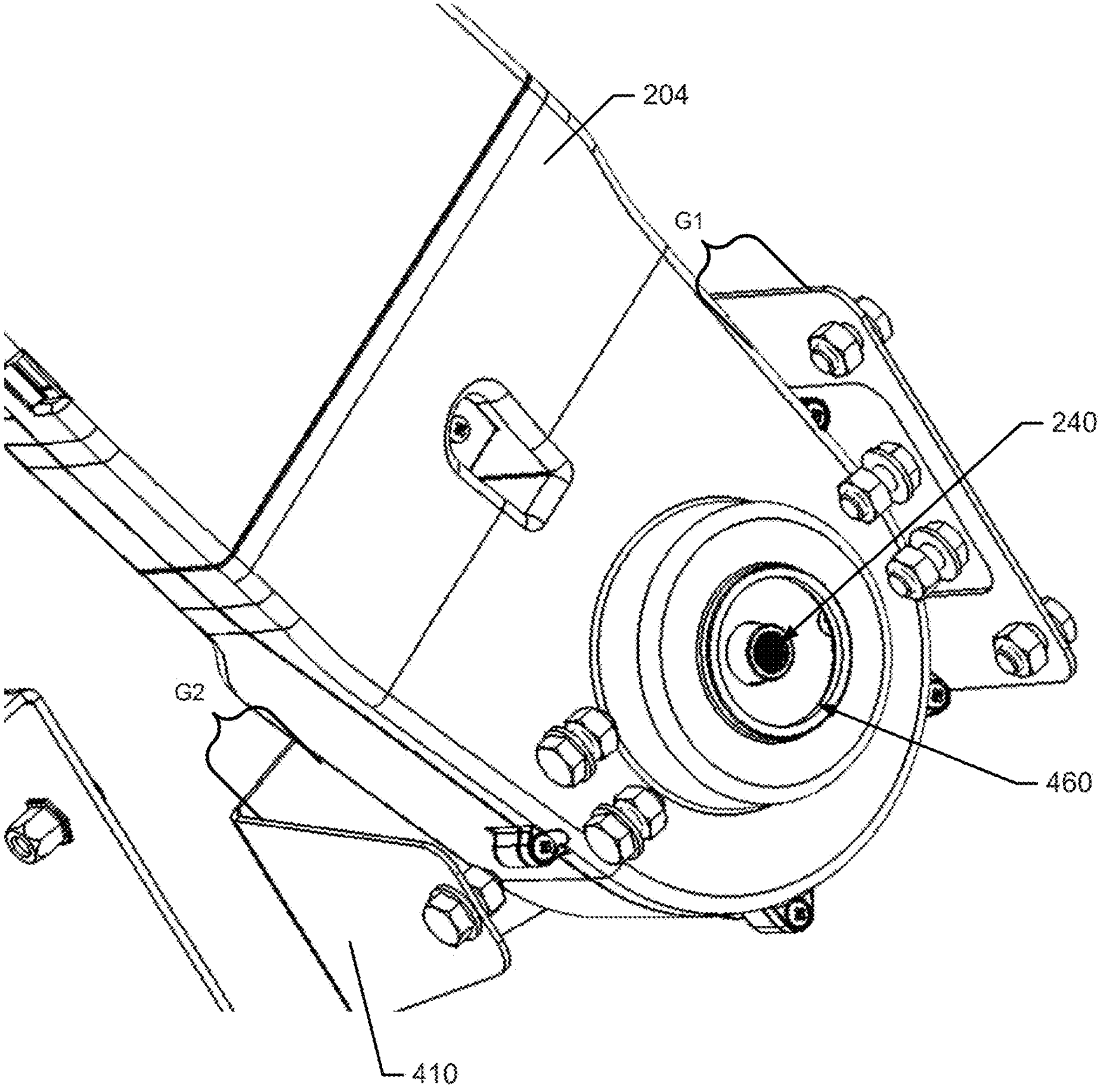
FIG. 9 illustrates a perspective view of the transmission assembly of FIG. 8 with the motorhead interface portion removed in accordance with an example embodiment.

As best seen in FIG. 6, the wall interface portion 400 may lie substantially parallel to the wall (e.g., front wall 140, a sidewall in some cases, or even the ceiling), and may be secured to the wall with screws or other fasteners. The motorhead interface portion 420 may attach to the wall interface portion 400 at a proximal end thereof, and may extend substantially perpendicularly away from the wall interface portion 400 until reaching a distal end of the motorhead interface portion 420. The transmission interface portion 410 of this example is not in contact with the wall interface portion 400, but instead is a C or U shaped, bounding bracket that attaches to the motorhead interface portion 420 to define a receiving cavity 430 inside which a portion of the transmission housing 200 is inserted and supported. A width (W) of the receiving cavity 430 may be just slightly larger than a width of the longitudinal sides 214 as measured between the respective base portions 210 of the first half shell 202 and the second half shell 204. Thus, the transmission housing 200 may fit between the apex portion of the C or U shape thereof and the motorhead interface portion 420 without much (if any) gap therebetween. However, the length (L) of the receiving cavity 430 may be noticeably larger than a width of the base portions 210 of the first and second half shells 202 and 204 (as measured between sidewalls 212) to create a gap on one or both sides of the transmission housing 200 and the arms of the C or U shape of the transmission interface portion 410. This gap allows some rotation of the transmission housing 200 (e.g., about the input axis 244) to account for various alignment differences between the tube 132 or drum 130 and the output coupler 250. FIG. 7 shows the gap having a first portion (G1) on one side of the transmission housing 200 and a second portion (G2) on the opposite side of the transmission housing 200. Rotation of the transmission housing 200 about the input axis 244 in either direction shown by double arrow 440 will change the location of the output axis 254 to permit alignment with the tube 132.

Notably, if the transmission housing 200 is rotated about the input axis 244 in one direction, the first portion (G1) of the gap may be reduced to zero, and the second portion (G2) may be maximized. At this position, a first angle may be formed between the longitudinal centerline 220 of the transmission housing 200 and a reference plane in which the motor output shaft 300 may lie. If the transmission housing 200 is rotated about the input axis 244 in the opposite direction, the second portion (G2) of the gap may be reduced to zero, and the first portion (G1) may be maximized. At this position, a second angle may be formed between the longitudinal centerline 220 of the transmission housing 200 and the reference plane. The transmission housing 200 may therefore be understood to be rotatable to any selected angle in between the first and second angles to an infinite number of non-discrete locations between the first and second angles.

In an example embodiment, the apex portion of the transmission interface portion 410 (i.e., the portion thereof between the arms of the C or U shape of the transmission interface portion 410) may include angle adjustment slots formed therein that have an arcuate shape maintaining a consistent distance from the input axis 244. In particular, a first slot 412 may enable a fastener (e.g., a screw or bolt) to pass through the first slot 412 to engage the transmission housing 200 on a first side of the input axis 244, and a second slot 414 may enable a fastener (e.g., a screw or bolt) to pass through the second slot 414 to engage the transmission housing 200 on a second and opposite side of the input axis 244. The first and second slots 414 may extend over a range of angles that is greater than or equal to the range between the first and second angles described above. However, in some cases, the second slot 414 may be split into two discrete slots that support flipping the transmission housing 200 upside down within the mounting bracket 150 as described above.

Figure 5:
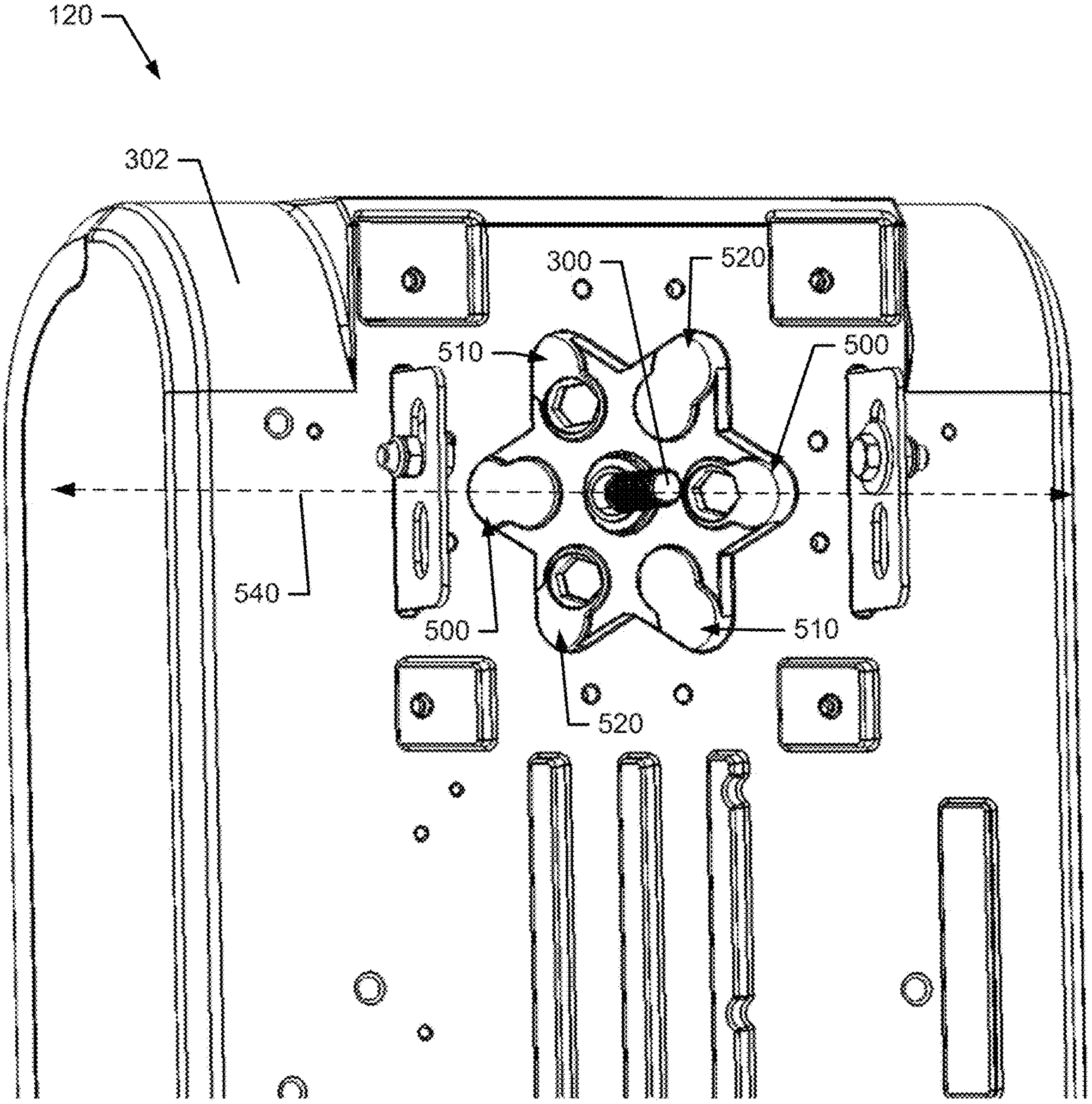
FIG. 5 shows a perspective view of an interface portion of the opener for mating with the transmission assembly according to an example embodiment.

As noted above, the mounting bracket 150 may also enable the mounting of the opener 120 relative to the mounting bracket 150 in a number of different discrete positions. This flexibility may be provided, at least in part, by the structure of the casing 302 (or housing) of the opener 120 and the structure of the motorhead interface portion 420. In particular, the motorhead interface portion 420 may include a shaft aperture 460 that is coaxial with the input axis 244 (and through which the motor output shaft 300 passes to engage the input coupler 240). On opposite sides of the shaft aperture 460, the motorhead interface portion 420 may include a pair of protrusions (e.g., a first protrusion 462 and a second protrusion 464). The first and second protrusions 462 and 464 may prevent a snug interface between the opener 120 and the motorhead interface portion 420 unless the first and second protrusions 462 and 464 are properly aligned with a corresponding receiver set formed in the casing 302 of the opener 120 around the motor output shaft 300. The receiver sets may include pairs of receivers, cavities, depressions, or the like that extend to a depth into the portion of the casing 302 that surrounds the motor output shaft 300 that is sufficient to fully receive the first and second protrusions 462 and 464. In the example of FIG. 5, the receiver sets are arranged in a six pointed star configuration such that a first receiver set 500 is angularly displaced from a second receiver set 510 by 60 degrees, and a third receiver set 520 is angularly displaced from the second receiver set 510 by 60 degrees (thereby also being angularly displaced 120 degrees from the first receiver set 500).

This arrangement may enable opener 120 to be oriented with respect to the mounting bracket 150 at a selected angle that may defined at intervals defined at 0, 60, 120, 180, 240 and 300 degrees relative to a reference plane 540 in which the input axis 244 lies (and which is perpendicular to the front wall 140 in the arrangement of FIG. 2). Of course, adding more points to the star, shifting the orientation, or various other modifications to these angles are also possible. However, in an example embodiment, the selected angle may be 0 degrees relative to the reference plane 540 when the transmission assembly 160 (and specifically the transmission housing 200) is mounted on a first lateral side of the sectional door, and may be 180 degrees relative to the reference plane 540 when the transmission assembly 160 is mounted on a second lateral side of the sectional door.

Figure 10:
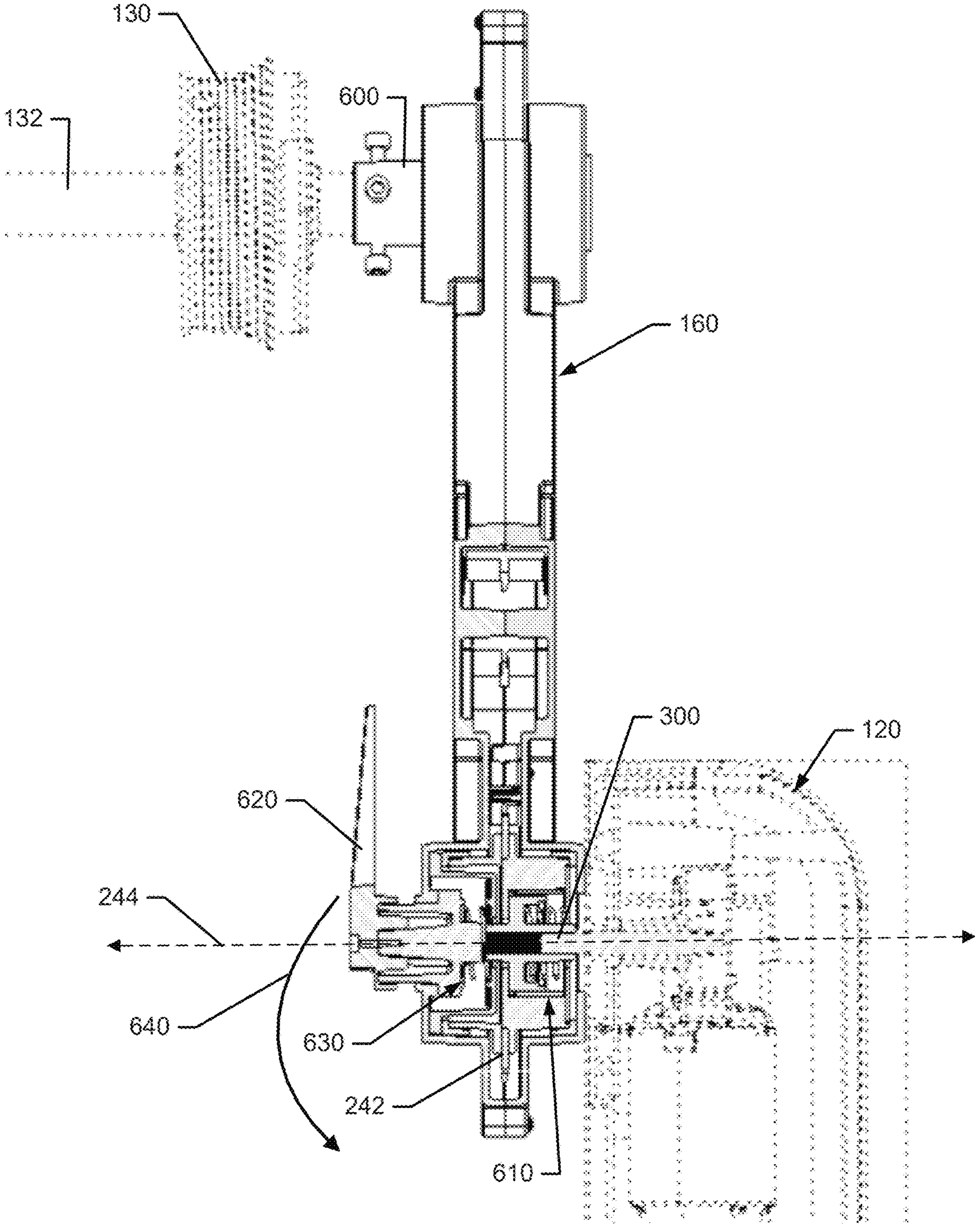
FIG. 10 illustrates a cross section view of components forming the releasable coupling assembly and engagement assembly with the releasable coupling assembly in the engaged state according to an example embodiment.

Although the mounting bracket 150 provides significant flexibility for mounting of the opener 120, including switching between the trolley configuration and the jackshaft configurations of FIGS. 1 and 2, it may be desirable to implement a release assembly to enable the opener 120 to be decoupled from the drive tube 132 (or drum 130). Implementation may be provided in the transmission assembly 160. FIG. 10 illustrates a partial cross section view of the transmission assembly 160 of an example embodiment.

Referring now to FIG. 10, only the components of the transmission assembly 160 are shown in solid lines. Other components are dashed. In this example, the output coupler 250 of the transmission assembly is operably coupled to or includes a collar 600 that is operably coupled to the drive tube 132 proximate to one of the drums 130. In an example embodiment, the input pinion 242 may be selectively operably coupled to the motor output shaft 300 of the opener 120 responsive to operation of a releasable coupling assembly 610. The releasable coupling assembly 610 may have an engaged state in which movement of the motor output shaft 220 is transferred to the input pinion 242 (and consequently through the flexible coupling member 230 to the drive tube 132), and a disengaged state in which movement of the motor output shaft 220 is not transferred to the input pinion 242. The disengaged state may, however, not alter the tensioning, positioning, alignment, etc. of the flexible coupling member 230.

In order to transition between the engaged and disengaged states of the releasable coupling assembly 610, the transmission assembly 160 may further include an operable member (e.g., operating lever, or handle 620), and a cam operated engagement assembly 630 that is operably coupled to the handle 620 and to the releasable coupling assembly 610. In this regard, when the handle 620 is in a first position (shown in FIG. 10), the engagement assembly 630 may position the releasable coupling assembly 610 (or enable such positioning) in the engaged state (as shown in FIG. 10). As noted above, in the engaged state the movement of the motor output shaft 300 may be transferred to the input pinion 242. Meanwhile, when the handle 620 is rotated (as shown by arrow 640) the engagement assembly 630 may reposition the releasable coupling assembly 610 to the disengaged state, so that the movement of the motor output shaft 300 is not transferred to the input pinion 242.

As noted above, the transmission assembly 160 is interchangeable with the guide rail 122 to make the transition between assembling the system in the jackshaft configuration or the ceiling mounted configuration as seamless and easy as possible. The interface between the transmission assembly 160 and the opener 120 has been described above in reference to FIGS. 3-9 in detail. The interface between the guide rail 122 and the opener 120 will now be described in reference to FIGS. 11-16.

Figure 11:
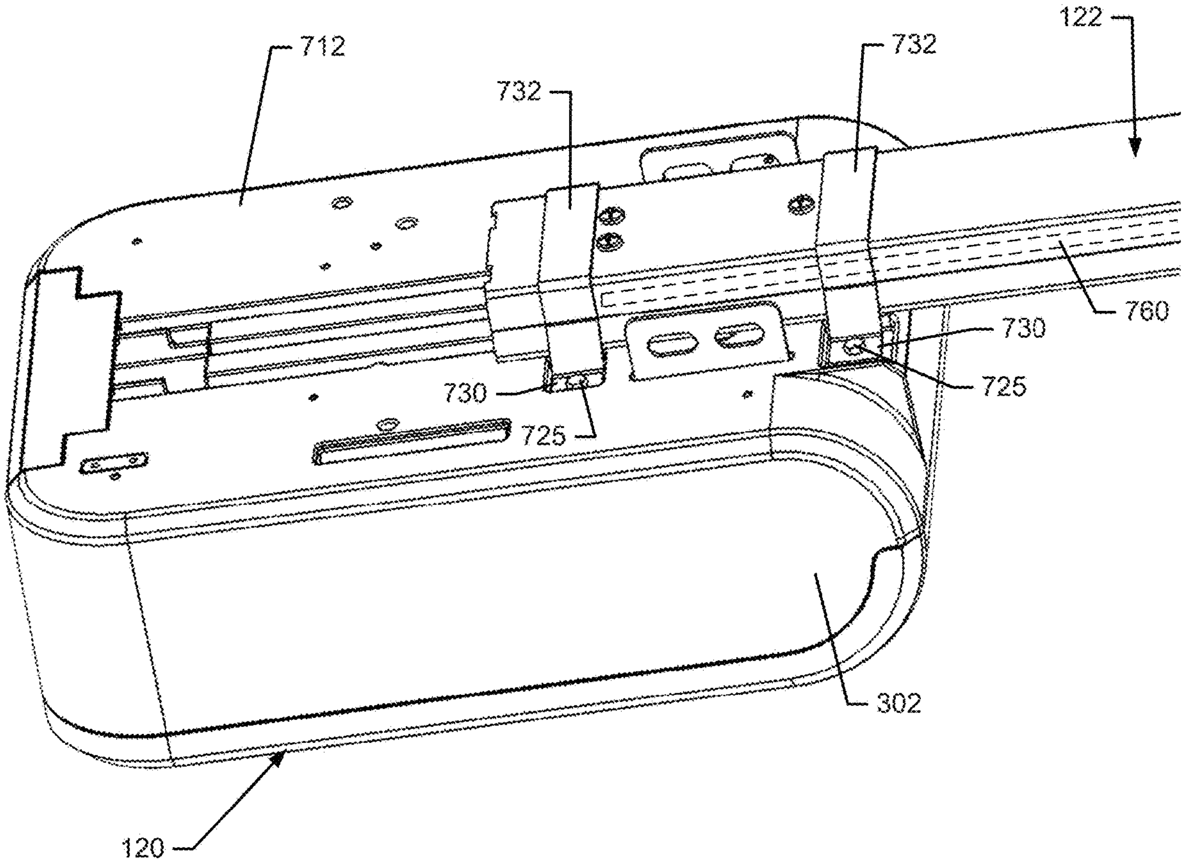
FIG. 11 shows a perspective view of the motorhead connected to the guide rail in accordance with an example embodiment.
Figure 12:
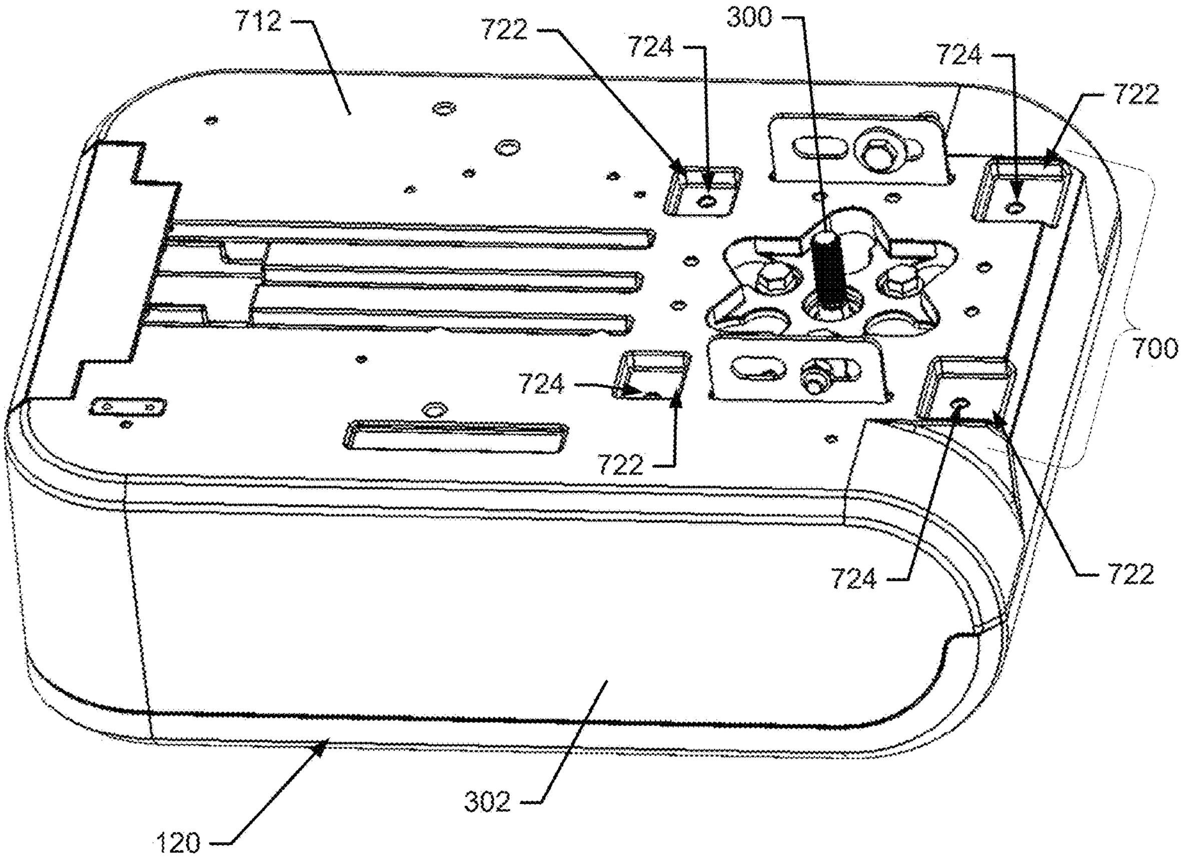
FIG. 12 shows the motorhead in isolation to expose the two different sets of mating patterns that are provided to form a multi-purpose mounting interface in accordance with an example embodiment.

In this regard, FIG. 11 shows a perspective view of the opener 120 connected to the guide rail 122, whereas FIG. 12 shows the opener 120 in isolation to expose the two different sets of mating patterns that are provided to form a multi-purpose mounting interface 700 of the opener 120. FIG. 13 provides a top view of the opener 120 to help show how the mounting interface 700 is recessed relative to a plane 710 in which a base portion 712 of a proximal side of the opener 120 lies, and FIGS. 14-16 provide further detailed views of the guide rail 122 are provided.

Referring first to FIGS. 11-13, it can be appreciated that the multi-purpose mounting interface 700 includes two distinctly different patterned interface portions that readily identify themselves to installers as corresponding to either being specifically designed to interface with the guide rail 122 or with the transmission assembly 160. Thus, although installation manuals, videos, or other materials would certainly guide the installer in proper installation in a selected one of the jackshaft configuration or the ceiling mounted configuration, even an installer without access to such resources for any reason can be intuitively guided toward a proper installation in all cases. The two distinctly different patterned interfaces may include a first mating pattern that defines a single fixed orientation for connection to the guide rail 122. Meanwhile, the second mating pattern, which may define multiple different orientations for connection to the transmission assembly 160 may be defined by the six pointed star configuration discussed above in reference to FIG. 5. Thus, for example, the second mating pattern may be defined by the first receiver set 500, the second receiver set 510, and the third receiver set 520 discussed above. The second mating pattern may therefore be recessed relative to the plane 710 and disposed in the base portion 712 of the opener 120 to orient the casing 302 relative to the input coupler 240 when the motor output shaft 300 is operably coupled to the input coupler 240.

The first mating pattern may be defined by a set of recesses 722 extending inwardly from a surface of the casing 302. The set of recesses 722 of this example includes four rectangular recesses that each further include a threaded receiver 724 therein to receive a bolt or screw, although other fasteners or fastening means may be substituted in other embodiments. The four rectangular recesses may be complementary in shape to contact surfaces 730 of a set of mounting brackets 732 that may extend around an input interface 740 of a track assembly 742 that includes the guide rail 122 and all hardware componentry attached thereto to enable operation and connection of the guide rail 122 with respect to adjacent components of GDO system 100 of FIGS. 1 and 2. In some cases, the mounting brackets 732 may extend around a top portion of the guide rail 122 and beyond a bottom portion of the guide rail 122 to extend into the set of recesses 722. A bolt, screw 725 or other fastener may then pass through the contact surface 730 of the mounting bracket 732 and into the threaded receiver 724 to fix the track assembly 742 (and particularly the guide rail 122) in a single fixed orientation relative to the opener 120.

The input interface 740 of the track assembly 742 may include a drive sprocket 750 that is driven responsive to turning of the motor output shaft 300 via interface of the splines of the motor output shaft 300 with a splined receiver 752 of or operably coupled to the drive sprocket 750. The drive sprocket 750, when rotated, may carry a flexible member 760 (e.g., a belt, chain, cable or the like—otherwise not visible due to being inside the but therefore shown in dashed lines in FIG. 11) to which the trolley 124 is attachable. In some cases, the guide rail 122 may be defined by a substantially rectangular tube that encloses the flexible member 760 (e.g., to avoid pinching hazards, while also preventing fouling of the flexible member 760) and inside which the trolley 124 may ride while moving with the flexible member 760.

Accordingly, some example embodiments may provide a garage door operator (GDO) conversion assembly for transitioning a GDO between a ceiling mounted configuration and a jackshaft configuration. The GDO conversion assembly may include a motorhead having a motor output shaft extending from a motorhead casing that may include a mounting interface disposed proximate to the motor output shaft, a track assembly including an input interface shaped to mate with the mounting interface to operably couple the motorhead to a sectional garage door in the ceiling mounted configuration, and a transmission assembly including an input coupler shaped to mate with the mounting interface to operably couple the motorhead to the sectional garage door in the jackshaft configuration. The transmission assembly may be interchangeable with the track assembly and further includes an output coupler to operably couple the transmission assembly to a drive tube rotatable to alternately open and close the sectional door in the jackshaft configuration. The output coupler may include an output pinion. The input coupler may include an input pinion operably coupled to the output pinion via a flexible coupling member. The transmission assembly may include a transmission housing configured to extend around at least a portion of each of the input pinion, the output pinion and the flexible coupling member, and a coupling bracket to operably couple the motorhead to either a wall or the ceiling.

The GDO conversion assembly and/or a system including the same, or components thereof described above may be augmented or modified by altering individual features mentioned above or adding optional features. The augmentations or modifications may be performed in any combination and in any order. For example, in some cases, the mounting interface may include a first mating pattern disposed in the motorhead casing to orient a guide rail of the track assembly relative to the motorhead casing when the motor output shaft is operably coupled to an input interface of the track assembly. The mounting interface may include a second mating pattern disposed in the motorhead casing to orient the transmission housing relative to the input coupler when the motor output shaft is operably coupled to the input coupler. In an example embodiment, the first mating pattern may defines a single fixed orientation for the mounting interface and the input interface of the track assembly, and the second mating pattern may define multiple different orientations for the mounting interface and the input coupler. In some cases, the first mating pattern may include a set of recesses extending inwardly from a surface of the motorhead casing to define a single fixed orientation for the mounting interface and the input interface of the track assembly. In an example embodiment, the set of recesses may receive one or more mounting brackets that extend around a top portion of the guide rail and beyond a bottom portion of the guide rail to extend into the set of recesses. In some cases, the second mating pattern may include a star shaped recess extending inwardly from a surface of the motorhead casing to define a plurality of orientations for the mounting interface and the input coupler of the transmission assembly. In an example embodiment, the coupling bracket of the transmission assembly may include a first protrusion and a second protrusion disposed on opposite sides of a shaft aperture that aligns with the input coupler when the transmission housing is disposed in the coupling bracket. The first and second protrusions may be aligned with a first receiver set or a second receiver set of the second mating pattern, and the first and second receiver sets may be separated from each other angularly with respect to the motor output shaft. In some cases, the second mating pattern may further include a third receiver set. The first, second and third receiver sets may each be angularly displaced from each other by sixty degrees to enable the second selected angle to be defined at intervals defined at 0, 60, 120, 180, 240 and 300 degrees relative to a reference plane in which the motor output shaft lies. In an example embodiment, the second mating pattern may be disposed proximate to the motor output shaft and the first mating pattern is disposed radially outwardly with respect to the second mating pattern relative to the motor output shaft. In some cases, the guide rail may enclose a second flexible member selectively attached to a trolley to carry the sectional door when the motorhead operates in the ceiling mounted configuration.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe exemplary embodiments in the context of certain exemplary combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. In cases where advantages, benefits or solutions to problems are described herein, it should be appreciated that such advantages, benefits and/or solutions may be applicable to some example embodiments, but not necessarily all example embodiments. Thus, any advantages, benefits or solutions described herein should not be thought of as being critical, required or essential to all embodiments or to that which is claimed herein. Although specific terms are employed herein, they are used in a generic and descriptive sense only and not for purposes of limitation.

What is claimed:

1. A garage door operator (GDO) conversion assembly for transitioning a GDO between a ceiling mounted configuration and a jackshaft configuration, the GDO conversion assembly comprising:

a motorhead having a motor output shaft extending from a motorhead casing, the motorhead casing comprising a mounting interface disposed proximate to the motor output shaft;

a track assembly comprising an input interface shaped to mate with the mounting interface to operably couple the motorhead to a sectional garage door in the ceiling mounted configuration; and a transmission assembly comprising an input coupler shaped to mate with the mounting interface to operably couple the motorhead to the sectional garage door in the jackshaft configuration, the transmission assembly being interchangeable with the track assembly and further comprising an output coupler to operably couple the transmission assembly to a rotatable drive tube to alternately open and close the sectional door, the output coupler comprising an output pinion, wherein the input coupler comprises an input pinion operably coupled to the output pinion via a flexible coupling member, wherein the transmission assembly further comprises a transmission housing configured to extend around at least a portion of each of the input pinion, the output pinion and the flexible coupling member, and a coupling bracket to operably couple the motorhead to either a wall or the ceiling, wherein the mounting interface comprises a first mating pattern disposed in the motorhead casing to orient a guide rail of the track assembly relative to the motorhead casing when the motor output shaft is operably coupled to the input interface of the track assembly, and wherein the mounting interface comprises a second mating pattern disposed in the motorhead casing to orient the transmission housing relative to the input coupler when the motor output shaft is operably coupled to the input coupler.

2. The GDO conversion assembly of claim 1, wherein the first mating pattern defines a single fixed orientation for the mounting interface and the input interface of the track assembly, and the second mating pattern defines multiple different orientations for the mounting interface and the input coupler.

3. The GDO conversion assembly of claim 1, wherein the first mating pattern comprises a set of recesses extending inwardly from a surface of the motorhead casing to define a single fixed orientation for the mounting interface and the input interface of the track assembly.

4. The GDO conversion assembly of claim 3, wherein the set of recesses receive one or more mounting brackets that extend around a top portion of the guide rail and beyond a bottom portion of the guide rail to extend into the set of recesses.

5. The GDO conversion assembly of claim 1, wherein the second mating pattern comprises a star shaped recess extending inwardly from a surface of the motorhead casing to define a plurality of orientations for the mounting interface and the input coupler of the transmission assembly.

6. The GDO conversion assembly of claim 1, wherein the coupling bracket of the transmission assembly comprises a first protrusion and a second protrusion disposed on opposite sides of a shaft aperture that aligns with the input coupler when the transmission housing is disposed in the coupling bracket, wherein the first and second protrusions are aligned with a first receiver set or a second receiver set of the second mating pattern, the first and second receiver sets being separated from each other angularly with respect to the motor output shaft.

7. The GDO conversion assembly of claim 6, wherein the second mating pattern further comprises a third receiver set, wherein the first, second and third receiver sets are each angularly displaced from each other by sixty degrees to enable a selected angle of the transmission housing to be defined at intervals defined at 0, 60, 120, 180, 240 and 300 degrees relative to a reference plane in which the motor output shaft lies.

8. The GDO conversion assembly of claim 1, wherein the second mating pattern is disposed proximate to the motor output shaft and the first mating pattern is disposed radially outwardly with respect to the second mating pattern relative to the motor output shaft.

9. The GDO conversion assembly of claim 1, wherein the guide rail encloses a second flexible member selectively attached to a trolley to carry the sectional door when the motorhead operates in the ceiling mounted configuration.

10. A garage door operator (GDO) system comprising:

a sectional garage door movable on rails between an open position and a closed position;

a motorhead operable to provide power for movement of the sectional door between the open and closed positions via turning of a drive tube in a jackshaft configuration or via movement of a trolley in a ceiling mounted configuration, the motorhead having a motor output shaft extending from a motorhead casing, the motorhead casing comprising a mounting interface disposed proximate to the motor output shaft; and a GDO conversion kit for transitioning a GDO between the ceiling mounted configuration and the jackshaft configuration, the GDO conversion kit comprising:

a track assembly comprising an input interface shaped to mate with the mounting interface to operably couple the motorhead to the sectional garage door in the ceiling mounted configuration; and a transmission assembly comprising an input coupler shaped to mate with the mounting interface to operably couple the motorhead to the sectional garage door in the jackshaft configuration, the transmission assembly being interchangeable with the track assembly and further comprising an output coupler to operably couple the transmission assembly to the drive tube to alternately open and close the sectional door, the output coupler comprising an output pinion, wherein the input coupler comprises an input pinion operably coupled to the output pinion via a flexible coupling member, wherein the transmission assembly further comprises a transmission housing configured to extend around at least a portion of each of the input pinion, the output pinion and the flexible coupling member, and a coupling bracket to operably couple the motorhead to either a wall or the ceiling, wherein the mounting interface comprises a first mating pattern disposed in the motorhead casing to orient a guide rail of the track assembly relative to the motorhead casing when the motor output shaft is operably coupled to the input interface of the track assembly, and wherein the mounting interface comprises a second mating pattern disposed in the motorhead casing to orient the transmission housing relative to the input coupler when the motor output shaft is operably coupled to the input coupler.

11. The GDO system of claim 10, wherein the first mating pattern defines a single fixed orientation for the mounting interface and the input interface of the track assembly, and the second mating pattern defines multiple different orientations for the mounting interface and the input coupler.

12. The GDO system of claim 10, wherein the first mating pattern comprises a set of recesses extending inwardly from a surface of the motorhead casing to define a single fixed orientation for the mounting interface and the input interface of the track assembly.

13. The GDO system of claim 12, wherein the set of recesses receive one or more mounting brackets that extend around a top portion of the guide rail and beyond a bottom portion of the guide rail to extend into the set of recesses.

14. The GDO system of claim 10, wherein the second mating pattern comprises a star shaped recess extending inwardly from a surface of the motorhead casing to define a plurality of orientations for the mounting interface and the input coupler of the transmission assembly.

15. The GDO system of claim 10, wherein the coupling bracket of the transmission assembly comprises a first protrusion and a second protrusion disposed on opposite sides of a shaft aperture that aligns with the input coupler when the transmission housing is disposed in the coupling bracket, wherein the first and second protrusions are aligned with a first receiver set or a second receiver set of the second mating pattern, the first and second receiver sets being separated from each other angularly with respect to the motor output shaft.

16. The GDO system of claim 15, wherein the second mating pattern further comprises a third receiver set, wherein the first, second and third receiver sets are each angularly displaced from each other by sixty degrees to enable a selected angle of the transmission housing to be defined at intervals defined at 0, 60, 120, 180, 240 and 300 degrees relative to a reference plane in which the motor output shaft lies.

17. The GDO system of claim 10, wherein the second mating pattern is disposed proximate to the motor output shaft and the first mating pattern is disposed radially outwardly with respect to the second mating pattern relative to the motor output shaft.

18. The GDO system of claim 10, wherein the guide rail encloses a second flexible member selectively attached to the trolley to carry the sectional door when the motorhead operates in the ceiling mounted configuration.

* * * * *